United States Patent
Chatterjee et al.

(10) Patent No.: US 6,989,196 B2
(45) Date of Patent: Jan. 24, 2006

(54) MICROENCAPSULATION OF MAGNETIC MATERIAL USING HEAT STABILIZATION

(75) Inventors: Jhunu Chatterjee, Tallahassee, FL (US); Yousef Haik, Tallahassee, FL (US); Ching-Jen Chen, Tallahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 5 days.

(21) Appl. No.: 10/676,406

(22) Filed: Oct. 1, 2003

(65) Prior Publication Data
US 2004/0065969 A1 Apr. 8, 2004

Related U.S. Application Data
(60) Provisional application No. 60/415,493, filed on Oct. 2, 2002.

(51) Int. Cl.
*B32B 5/16* (2006.01)
*B01J 13/02* (2006.01)

(52) U.S. Cl. .................. 428/402.24; 264/4.7; 264/407; 264/427; 264/442; 428/689; 428/692; 424/1.21; 424/1.37; 424/490; 424/491; 424/951

(58) Field of Classification Search ................. 264/4.7, 264/407, 427, 442; 428/402.24, 689, 692; 424/1.21, 1.37, 490, 491, 951
See application file for complete search history.

(56) References Cited

U.S. PATENT DOCUMENTS

| 4,774,265 A | * | 9/1988 | Ugelstad et al. ............... 521/55 |
| 4,861,627 A | | 8/1989 | Mathiowitz |
| 5,720,921 A | | 2/1998 | Meserol |
| 5,763,203 A | * | 6/1998 | Ugelstad et al. ............ 435/7.24 |
| 5,874,029 A | | 2/1999 | Subramaniam et al. |
| 5,985,312 A | * | 11/1999 | Jacob et al. ................. 424/434 |
| 6,048,515 A | | 4/2000 | Kresse et al. |
| 6,129,848 A | | 10/2000 | Chen et al. |
| 6,143,211 A | * | 11/2000 | Mathiowitz et al. ............ 264/4 |
| 6,632,671 B2 | | 10/2003 | Unger |
| 6,763,203 B2 | | 7/2004 | Yoshioka et al. |
| 2003/0086867 A1 | * | 5/2003 | Lanza et al. ................ 424/1.11 |
| 2003/0146529 A1 | | 8/2003 | Chen et al. |

OTHER PUBLICATIONS

Chatterjee, et al., "Modification and characterization of polystyrene–based magnetic microsperes and comparison with albumin–based magnetic microspheres," *J. Magetism & Magnetic Mater.* 225:21–29 (2001).

Chatterjee, et al., "Synthesis and characterization of heat–stabilized albumin magnetic microspheres," Colloid & Polymer Sci., 279:1073–81 (2001).

Gupta, et al., "Albumin microspheres. III. Synthesis and characterization of microspheres containing adriamycin and magnetite," Int'l J. Pharmaceutics 43:167–77 (1988).

(Continued)

*Primary Examiner*—Samuel A. Acquah
(74) *Attorney, Agent, or Firm*—Sutherland Asbill & Brennan LLP

(57) ABSTRACT

Microencapsulation methods and products are provided. The method includes forming, at a first temperature, a emulsion which comprises aqueous microdroplets, including the agent (e.g., a magnetic material or drug) and a cross-linkable matrix material (e.g., a protein such as albumin), dispersed in a hydrophobic continuous phase comprising an oil and an oil-soluble surfactant, the first temperature being below the temperature effective to initiate cross-linking of the matrix material, and then heating the emulsion to a temperature and for a time effective to cause the matrix material to self-crosslink, to form microparticles comprising the agent encapsulated by the crosslinked matrix material.

36 Claims, 2 Drawing Sheets

OTHER PUBLICATIONS

Kyung–Nam Lee, et al., "Synthesis of phenolic/fufural gel microspheres in supercritical $CO_2$," *J. Supercrit. Fluids* 17:73–80 (2000).

Morimoto & Fujimoto, "Albumin Microspheres as Drug Carriers," *CRC Crit. Rev. Therapeutic Drug Carrier Systems* 2(1):19–63.

Suslick, et al., "Nanostructured Materials Generated by High–Intensity Ultrasound: Sonochemical Synthesis and Catalytic Studies," *Chem. Mater.* 8:2172–79 (1996).

Yarovoy, et al., "Submicron–Sized Particles of Ultrahigh Molecular Weight Polyethylene Produced via Nonsolvent and Temperature–Induced Crystallization," *J. Biomed. Mater. Res.* (Appl Biomater.) 53:152–60 (2000).

Scheffel, et al., "Albumin Microspheres for Study of the Reticuloendothelial System" J. Nucl. Rad., 13:498–503 (1972).

Zolle, et al., "Preparation of Metabilizable Radioactive Human Serum Albumin Microspheres for Studies of the Circulation", Int. J. of Applied Radiation and Isotopes 21:155–167 (1970).

* cited by examiner

MICROENCAPSULATION OF MAGNETIC MATERIAL USING HEAT STABILIZATION

CROSS-REFERENCE TO RELATED APPLICATIONS

Priority is claimed to U.S. Provisional Application No. 60/415,493, filed Oct. 2, 2002. The application is incorporated herein by reference.

BACKGROUND OF THE INVENTION

This invention relates generally to micro- and nano-encapsulation methods, particularly for synthesizing magnetic microparticles, for use in biomedical or other applications.

Chemically cross-linked materials have been used to form microparticles. The cross-linkable material forming the matrix can be a synthetic polymer or a natural polymer or protein, for example. The microparticles formed with these materials have been used for biomedical applications, primarily in the areas of drug delivery, immunoassay, and cell separation technologies. Chatterjee, et al., *J. Mag. Magn. Mat.* 225:21 (2001) discloses a method of forming encapsulated particles by dissolving a polymer and a particular inorganic particle in an aqueous solvent, forming an oil-in-water emulsion, and stabilizing the particles using chemical cross-linking. The stabilization by chemical cross-linking can undesirably permit agglomeration. It therefore would be desirable to avoid using a chemical cross-linker in a process for forming microparticles. It would be particularly desirable to make such nanoparticles without requiring an emulsion polymerization reaction.

SUMMARY OF THE INVENTION

A method is provided for microencapsulating an agent. In one aspect, the method comprises forming, at a first temperature, an emulsion which comprises aqueous microdroplets, including the agent and a cross-linkable matrix material, dispersed in a hydrophobic continuous phase comprising an oil and an oil-soluble surfactant, the first temperature being below the temperature effective to initiate cross-linking of the matrix material, and then heating the emulsion to a temperature and for a time effective to cause the matrix material to self-cross-link, to form microparticles comprising the agent encapsulated by the cross-linked matrix material. In one embodiment, the emulsion is formed by sonicating a mixture of an aqueous dispersion of the agent, in which the matrix material has been dissolved, with a hydrophobic liquid, such as an oil. In one embodiment, the step of heating the emulsion comprises mixing the emulsion into a second quantity of the hydrophobic liquid which has been heated. In one embodiment, the method further includes isolating the microparticles from the hydrophobic liquid.

In various embodiments, the cross-linkable matrix material is biodegradable. In one embodiment, the matrix material comprises a protein, such as an albumin, e.g., human serum albumin.

In various embodiments, the agent comprises a magnetic material. For example, the magnetic material could be one that includes iron, nickel, or cobalt. In one embodiment, the magnetic material comprises maghemite. In other embodiments, the agent comprises a drug, a diagnostic agent, an inorganic fertilizer, or an inorganic pigment.

In several embodiments, the agent comprises nanoparticles having a number average diameter between 5 nm and 50 nm. The nanoparticles can be superparamagnetic. For example, the nanoparticles could include nickel, cobalt, or iron (e.g., maghemite).

In one embodiment, the method produces microparticles having a number average diameter between 100 and 1000 nm, e.g., between 300 and 800 nm.

In one embodiment, thee hydrophobic continuous phase comprises an oil such as a vegetable oil (e.g., cottonseed oil) or a mineral oil (silicon oil).

In one embodiment, the oil soluble surfactant is selected from the group consisting of sorbitan esters, polyoxyethylene ethers, glycerol esters, sucrose esters, diblock copolymers of polyoxyethylene and polyoxypropylene, and triblock copolymers of polyoxyethylene and polyoxypropylene. In one embodiment, the oil soluble surfactant comprises sorbitan sesquioleate.

In one embodiment, the method further comprises adsorbing a protein-binding ligand onto the microparticles. Examples of such ligands include avidin, biotin, streptavidin, and lectins. In one specific embodiment, the method further comprises modifying the microparticles with lectin or other carbohydrate binding protein effective for coupling with red blood cells.

In another aspect, a composition is provided which comprises a microencapsulated agent made the methods described herein. For example, in one embodiment, the agent comprises maghemite in the form of nanoparticles having a number average diameter between 5 nm and 50 nm, the matrix material comprises an albumin, and the microparticles have a number average diameter between 300 and 800 nm.

DETAILED DESCRIPTION OF THE INVENTION

Figure 1:
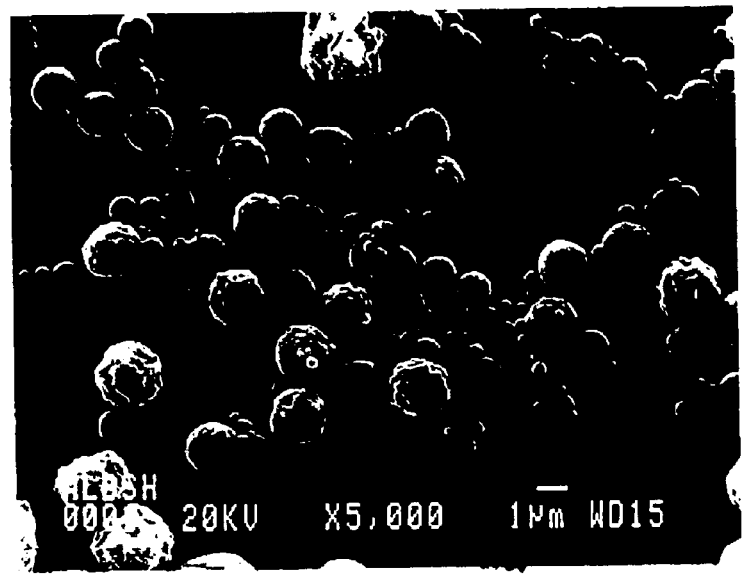
FIG. 1 is a scanning electron micrograph of albumin magnetic microspheres (taken in a dispersion) made by one embodiment of the microencapsulation process described herein.

Improved microencapsulation methods have been developed for making microparticles using a heat induced cross-linking process. In one embodiment, the method includes forming, at a first temperature, an emulsion which comprises aqueous microdroplets, including the agent (e.g., a magnetic material or drug) and a cross-linkable matrix material (e.g., a protein such as albumin), dispersed in a hydrophobic continuous phase comprising an oil soluble surfactant, the first temperature being below the temperature effective to initiate cross-linking of the matrix material, and then heating the emulsion to a temperature and for a time effective to cause the matrix material to self-crosslink, to form microparticles comprising the agent encapsulated by the crosslinked matrix material. The heat treatment step was used to cause the formation of intermolecular bonds between adjacent matrix material chains, e.g., the formation of disulfide bridges between the free SH groups on adjoining protein chains. Thus, the thermal denaturation is a curing process that yields a crosslinked polymer network structure. Microspheres comprised of heat-stabilized albumin encapsulating maghemite were found to be more stable and more polydisperse than microspheres made by a chemical crosslinking process. Smaller more uniform particles result from the present process, which is also relatively quicker and easier to use than conventional chemical crosslinking processes.

The microparticles made by the method generally are substantially spherical, i.e., microspheres. Exemplary ranges for the diameter of the microparticles include from about 100 nm to about 3000 nm, more preferably from about 100 nm to about 2000 nm. Exemplary ranges for the number average diameter of the microparticles are from about 300 nm to about 800 nm. Filtration techniques can be used to isolate various subsets of sizes ranges of particles. The size can be critical to many applications. In particular, for in vivo applications, the size can determine whether the particles accumulate and/or how the body removes (e.g., phagocytosis) or biodegrades them.

Stable magnetic microspheres can be made using the encapsulation process described herein. By "stable" is meant that the location of the magnetic particle should be predominately inside the microsphere. In contrast, a microsphere consisting of magnetic particles adsorbed onto a microsphere would not be considered stable, because the adsorbed particle may detach from the surface during washing or a change in temperature or pH of the medium in which the microspheres operate.

The Emulsion

The first step(s) in the microencapsulation process include forming a emulsion. The emulsion is a water-in-oil emulsion. The dispersed phase, i.e., the microdroplets, includes the agent to be encapsulated and the crosslinkable matrix material in water or an aqueous solution. The microdroplets are dispersed in a continuous phase which includes a hydrophobic liquid and an oil soluble surfactant. The components of the mixture are combined and then emulsified using techniques and equipment known in the art. In one embodiment, the emulsification is done using conventional sonication equipment (e.g., an ultrasonic homogenizer), while maintaining the emulsion at a temperature below the temperature effective to initiate cross-linking of the matrix material (e.g., in a processing vessel immersed in a cooling bath).

Ultrasonic mixing enables the formation of homogeneous emulsion with very well dispersed phases. Preferably, the sonication is conducted at an amplitude between about 50% and about 60%. While higher amplitudes usually give smaller particles, such a process would generate significant amounts of undesirable heating, which could prematurely initiate crosslinking. Generally, sonication for about 30 seconds is sufficient to achieve a homogenous mixture. As used herein, "sonication", "ultrasonic mixing," and "ultrasonication" all refer to the technique known in the art that uses the application of acoustic energy to mix components together.

The Agent

The agent (i.e., the material to be encapsulated) can be essentially any microparticulate material that is stable across the range of temperatures encountered by the material in the present encapsulation process, and that is substantially nonreactive with the matrix material and hydrophobic materials used. Examples of agents include magnetic materials, drugs (i.e., therapeutic or prophylactic agents), diagnostic agents (e.g., contrast agents), inorganic fertilizers, or inorganic pigments.

In several embodiments, the agent comprises nanoparticles having a number average diameter between 5 nm and 50 nm. The nanoparticles can be superparamagnetic. For example, the nanoparticles could include nickel, cobalt, or iron (e.g., maghemite).

In one embodiment, the agent comprises or consists of superparamagnetic nanoparticles. The superparamagnetic nanoparticles preferably have an average diameter between about 5 nm and about 50 nm. The superparamagnetic nanoparticles can comprise iron, nickel, cobalt, and/or their alloys. One material for the superparamagnetic nanoparticles is an iron oxide, such as magnetite, or more preferably, maghemite ($\lambda Fe_2O_3$). (Magnetite is susceptible to oxidation, whereas maghemite is more stable to oxidation.) In other embodiments, the magnetic nanoparticles comprise an alloy or a mixture of elemental materials. For example, the magnetic nanoparticles can comprise iron-neodymium-boron.

The size of the agent particle preferably is between about 5 nm and about 100 nm. Particularly for magnetic particles, the smaller sizes, e.g., between about 5 nm and about 10 nm, is preferred. A small size distribution is also preferred, as this can aid in determining the necessary magnetic force to separate the nanoparticles from a fluid medium.

The agent particles can be obtained using methods known in the art, depending, for example, on the particular agent to be encapsulated, and the desired size of the particles. Methods for making the superparamagnetic nanoparticles can be produced using any suitable process known in the art. For example, one technique for producing iron oxide nanoparticles involves co-precipitation and sonication. Once obtained, the superparamagnetic nanoparticles or other agent particles can be modified by treating them with an anionic surfactant to render them susceptible to microencapsulation, that is, to promote their complexation or attachment to the matrix material in the presently described encapsulation method.

The agent generally comprises between 5 and 40 wt % of the microparticles. In one embodiment, the agent comprises between 25 and 35 wt % of the microparticles. For example, the amount of magnetic material may depend on how much magnetic strength is desired for the final encapsulated particles.

Cross-Linkable Matrix Material

The matrix material forms the bulk microparticle structure in which the agent is dispersed, encapsulated. It comprises a crosslinkable material that will crosslinks with itself upon heating. Preferably, the matrix material is biodegradable.

In one embodiment, the matrix material comprises a synthetic or natural polymer. In another embodiment, the matrix material comprises a protein. In one embodiment, the protein is an albumin. In a preferred embodiment, the matrix material comprises a human serum albumin. Examples of other matrix materials include bovine serum albumin, egg albumin, and a variety of thermosetting polymers, including epoxies, polyurethanes, phenol/formaldehyde, and urea/formaldehyde resins.

Hydrophobic Liquid Phase

In one embodiment, the hydrophobic continuous phase comprises an oil which is substantially immiscible with the matrix material or the agent. The main criteria of the oil chosen is the flash point of the oil. The flash point of the oil should be much higher than the denaturation temperature of the protein and for other hydrophobic solvents, the boiling point should be much higher than the denaturation temperature.

In one embodiment, the oil is biocompatible and non-toxic in the trace amounts, if any, that may remain with the isolated microparticles made by the process described herein. The oil can be a vegetable oil or a mineral oil. Examples of suitable vegetable oils include cottonseed oil, rapeseed oil, and corn oil. Examples of suitable mineral oils include silicon oil. In still other embodiments, the hydrophobic phase is a mixture of toluene and chloroform, or isooctane and a mixture of petroleum ether with corn oil.

Oil Soluble Surfactant

The hydrophobic continuous phase further includes one or more surfactants effective to reduce hydrophobicity of the matrix material to mitigate agglomeration of the microdroplets. Generally, the surfactant is mainly added in the oil phase in a water-in-oil emulsion to disperse the microdroplets more evenly in the final emulsion, and the type and amount of surfactant determines whether nanospheres or microspheres are formed. Examples of suitable oil soluble surfactants include sorbitan esters (e.g., sorbitan trioleate, sorbitan monooleate, sorbitan monolaurate, polyoxyethylene (20) sorbitan monolaurate, and polyoxyethylene (20) sorbitan monooleate); polyoxyethylene ethers (e.g., oleyl polyoxyethylene (2) ether, stearyl polyoxyethylene (2) ether, lauryl polyoxyethylene (4) ether); glycerol esters; sucrose esters; and diblock and triblock copolymers of polyoxyethylene and polyoxypropylene (e.g., poloxamer 188 (Pluronic™ F-68), poloxamer 407 (Pluronic™ F-127), poloxamer 338). In one embodiment, the surfactant includes sorbitan sesquioleate.

Heat-Stabilization

The second step(s) in the microencapsulation process include heat stabilization of the microdroplets. The heat stabilization step involves heating the emulsion to a temperature and for a time effective to cause the matrix material to self-crosslink, to form microparticles comprising the agent encapsulated by the crosslinked matrix material. Preferably, this step also provides for the evaporation of water from the microdroplets, which further rigidifies the microparticles.

The temperature and duration of heating is selected for optimum crosslinking of the particular matrix material, without degrading the encapsulated agent. For example, a protein, such as albumin, can be heated to temperature of between 110 and 180° C. to effect crosslinking, over a period from 10 minutes to 75 minutes.

Further Processing

Optionally, a variety of protein-binding ligands can be adsorbed onto the microparticles. Representative examples of suitable ligands include avidin, biotin, streptavidin, and lectins. For example, in one embodiment, avidin-coating polymeric magnetic nanoparticles can be used in the magnetic separation of red blood cells. The avidin can act as a bridge that couples with polymeric nanoparticles modified with biotinylated lectin. The lectin in the magnetic particle attaches to the sugar terminal on the red blood cell membrane, enabling the red blood cell to be separated from its biological medium.

Optionally, the microparticles can be further encapsulated in a polymeric shell to provide additional or a different functionality. For example, it may be desirable to ensure that the magnetic material is within the particle and not on the surface of the particle. In addition, the polymeric coating may serve to functionalize the particle, for example to couple it with a suitable ligand. For example, a polystyrene magnetic particle can be functionalized with a carboxyl group or hydroxyl group by copolymerizing the first layer with acrylates or phenolics, in order to couple the particle with a protein.

Uses of the Microparticles

The microparticles made by the process described herein can be used in a variety of applications. Representative examples of such applications include magnetic separation processes, MRI, immunoassays, in vitro diagnostics, as a medium for transdermal drug delivery, and other biomedical processes, such as cell labeling, phagocytosis, site specific chemotherapy, radio immunoassay, affinity chromatography, and enzyme assay, and so forth. The particles could be useful in drug delivery or diagnostic imaging (e.g., for the delivery of contrast agents). Other possible applications include calibration of flow cytometers, particle and hematology analyzers, confocal laser scanning microscopes, and zeta potential measuring instruments; supports for immobilized enzymes, peptide synthesis, and separation phases for chromatography.

In a preferred embodiment, the magnetic nanoparticles are used in a batch or continuous process for the magnetic separation and isolation of blood components from a whole blood sample (e.g., blood cell separation), for the treatment and clinical and laboratory testing of such blood components. Such magnetic processes are described, for example, in U.S. Pat. No. 6,129,848 to Chen, et al., which is incorporated herein by reference.

Biodegradable magnetic nanoparticles of heat stabilized albumin (e.g., made as described in Example 1 below) can be used to separate the red blood cells by using an external magnetic field. Certain types of skin cancer treatment require complete separation of red blood cells from the whole blood in order to get purely white blood cells which are treated with a particular pharmaceutical (e.g., therapeutic) agent. By modification of these particles with avidin and biotinylated lectin, they can be attached the membrane of red blood cells, thus enabling these coupled nanoparticles-cells to be separated by an external magnetic field. Similarly, the nanoparticles can be used to isolate white blood cells.

In another embodiment, the microparticles made as described herein can be made to include one or more pharmaceutical agents, and the particles can be utilized in the targeted delivery of drugs.

The invention can be further understood with the following non-limiting examples.

EXAMPLE 1

Synthesis of Albumin Magnetic Microspheres

Human serum albumin (HSA) magnetic microspheres containing 30% iron oxide particles were synthesized by a heat-stabilization process. HSA and cottonseed oil were obtained from Sigma Chemical Company. Iron oxide particles (maghemite with average size of 26 nm) were obtained from Nanotechnology Corporation.

HSA (250 mg) was dissolved in a dispersion of 75 mg iron oxide in 1 mL distilled water. The resulting solution/dispersion was added to 30 mL cottonseed oil containing 0.2 mL sorbitan sesquioleate. The mixture was shaken vigorously and then sonicated (using a Cole Parmer ultrasonic homogenizer) for three 30 s intervals at an amplitude of 60%. The sonication process was performed at 4° C. using an ice-water bath. The resulting (primary) emulsion was then added dropwise into 100 mL cottonseed oil heated at 130° C. and stirred at 1500 rpm, with the addition completed in 10 minutes. The mixture was kept at 130° C. and stirred for another 15 minutes, to produce heat-stabilized microspheres.

The microspheres were then cooled and extracted with diethyl ether, and then washed by adding diethyl ether and centrifuging. The dispersion of microspheres in ether was then filtered successively using nylon filter membranes (Pall Specialty Chemicals) with pore sizes of 3, 1.2, 0.8, 0.65, 0.45, and 0.30 µm. The retained microspheres were collected, dried, and stored for subsequent testing.

EXAMPLE 2

Characteristics of Albumin Magnetic Microspheres

The microparticles made in Example 1 were examined using scanning electron microscopy (SEM), atomic force microscopy (AFM), transmission electron microscopy (TEM), energy-dispersive X-ray analysis (EDXA), atomic absorption spectroscopy, and a superconducting quantum interference device (SQUID) magnemometer.

Figure 2:
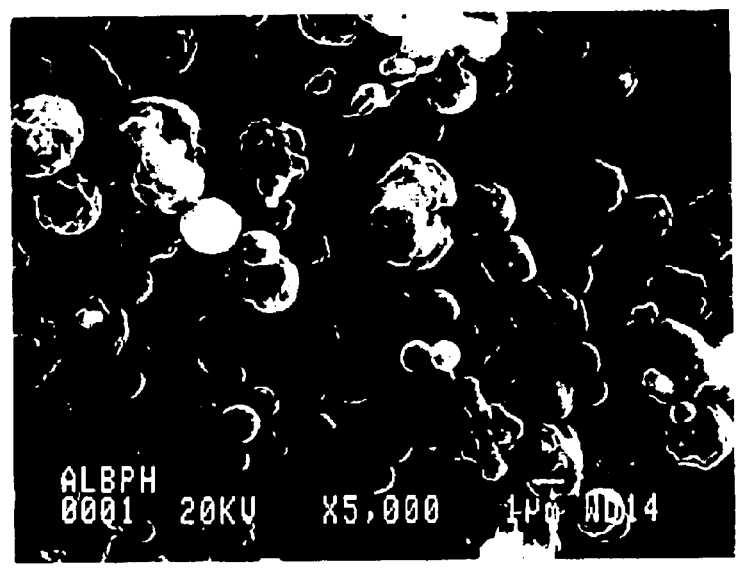
FIG. 2 is a scanning electron micrograph of albumin magnetic microspheres (taken in powder form) made by one embodiment of the microencapsulation process described herein.

SEM and AFM results show microspheres that are substantially not agglomerated and that have a textured (i.e., non-smooth, cauliflower-like) surface, which is believed to result from the crosslinking process. See FIGS. 1 and 2.

Figure 3:
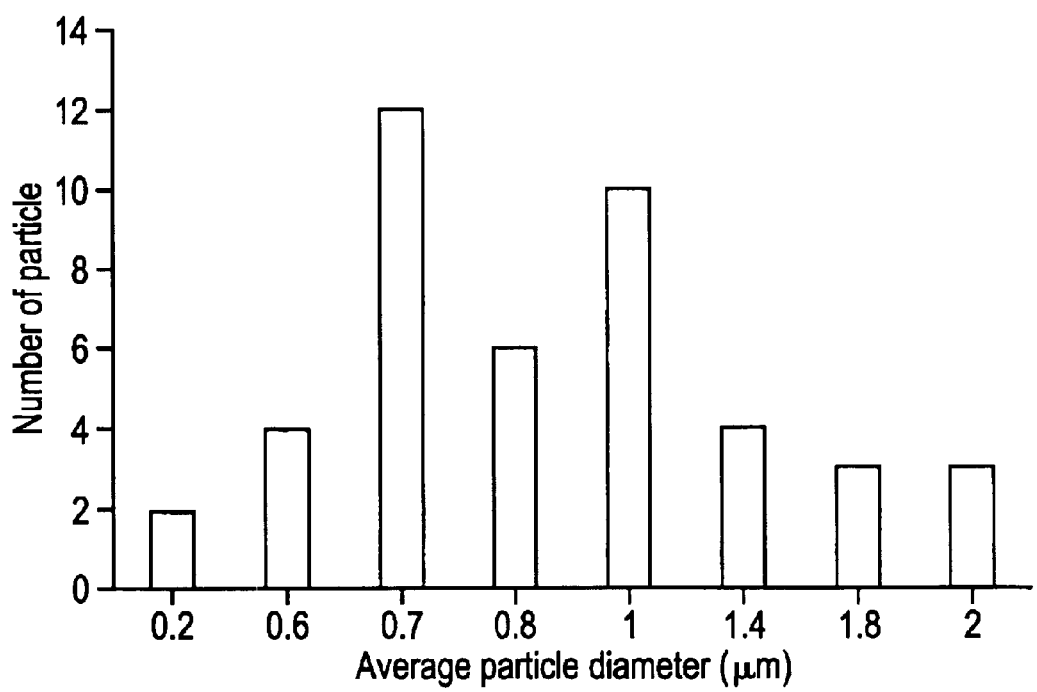
FIG. 3 is a graph showing average particle size diameter versus the number of particles of albumin magnetic microspheres, in a dispersion, made by one embodiment of the microencapsulation process described herein.
Figure 4:
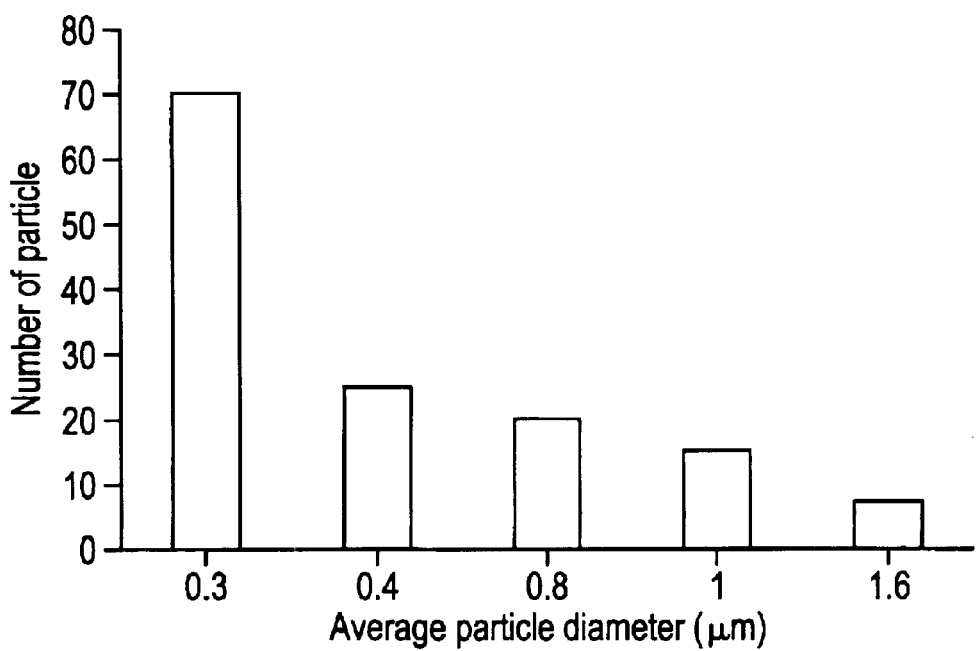
FIG. 4 is a graph showing average particle size diameter versus the number of particles of albumin magnetic microspheres, in powder form, made by one embodiment of the microencapsulation process described herein.

In comparison to chemically stabilized microspheres made and tested in an earlier study, the heat stabilized microspheres made in Example 1 above possess a narrower size distribution. Histograms as obtained from SEM for the particle size distribution in dispersion and in powder form are shown in FIGS. 3 and 4, respectively.

The results of the EDXA showed that the magnetic particles were essentially evenly distributed in the microsphere and did not cover the entire volume of the microsphere. This was supported by the TEM results.

Atomic absorption analysis showed approximately 32% iron in the microspheres, which is significantly higher than that obtained in chemically stabilized microspheres made and tested in an earlier study.

The magnemometer analysis showed that microspheres have superparamagnetic characteristics.

Publications cited herein and the materials for which they are cited are specifically incorporated by reference. Modifications and variations of the methods and devices described herein will be obvious to those skilled in the art from the foregoing detailed description. Such modifications and variations are intended to come within the scope of the appended claims.

We claim:

1. A method for microencapsulating an agent comprising:
   forming, at a first temperature, an emulsion which comprises aqueous microdroplets, including the agent and a cross-linkable matrix material, dispersed in a hydrophobic continuous phase comprising an oil and an oil-soluble surfactant, the first temperature being below the temperature effective to initiate cross-linking of the matrix material; and
   heating the emulsion to a temperature and for a time effective to cause the matrix material to self-crosslink, to form microparticles comprising the agent encapsulated by the crosslinked matrix material.

2. The method of claim 1, wherein the agent comprises a magnetic material.

3. The method of claim 2, wherein the magnetic material comprises iron, nickel, or cobalt.

4. The method of claim 3, wherein the magnetic material comprises maghemite.

5. The method of claim 1, wherein the agent comprises nanoparticles having a number average diameter between 5 nm and 50 nm.

6. The method of claim 5, wherein the nanoparticles are superparamagnetic.

7. The method of claim 6, wherein the superparamagnetic nanoparticles comprise iron, nickel, or cobalt.

8. The method of claim 7, wherein the superparamagnetic nanoparticles comprise maghemite.

9. The method of claim 1, wherein the matrix material is biodegradable.

10. The method of claim 1, wherein the matrix material comprises a protein.

11. The method of claim 1, wherein the matrix material comprises an albumin.

12. The method of claim 1, wherein the matrix material comprises a human serum albumin.

13. The method of claim 1, wherein the agent comprises a drug.

14. The method of claim 1, wherein the agent comprises a diagnostic agent, an inorganic fertilizer, or an inorganic pigment.

15. The method of claim 1, wherein the microparticles have a number average diameter between 100 and 1000 nm.

16. The method of claim 1, wherein the microparticles have a number average diameter between 300 and 800 nm.

17. The method of claim 1, wherein the oil is a vegetable oil or a mineral oil.

18. The method of claim 1, wherein the oil soluble surfactant is selected from the group consisting of sorbitan esters, polyoxyethylene ethers, glycerol esters, sucrose esters, diblock copolymers of polyoxyethylene and polyoxypropylene, and triblock copolymers of polyoxyethylene and polyoxypropylene.

19. The method of claim 1, wherein the oil soluble surfactant comprises sorbitan sesquioleate.

20. The method of claim 1, wherein the emulsion is formed by sonication.

21. The method of claim 1, wherein the step of heating the emulsion comprises mixing the emulsion into a quantity of a heated oil.

22. The method of claim 1, further comprising isolating the microparticles from the hydrophobic continuous phase.

23. The method of claim 1, further comprising adsorbing a protein-binding ligand onto the microparticles.

24. The method of claim 23, wherein the protein-binding ligand is selected from the group consisting of avidin, biotin, streptavidin, and lectins.

25. A method for microencapsulating an agent comprising:
   forming, at a first temperature, an emulsion which comprises aqueous microdroplets, including the agent and a cross-linkable matrix material which comprises a protein, dispersed in a hydrophobic continuous phase comprising an oil soluble surfactant, the first temperature being below the temperature effective to initiate cross-linking of the protein; and
   heating the emulsion to a temperature and for a time effective to cause the protein to self-crosslink, to form microparticles comprising the agent encapsulated by the crosslinked matrix material.

26. The method of claim 25, wherein the agent comprises maghemite.

27. The method of claim 25, wherein the protein comprises an albumin.

28. The method of claim 23, further comprising modifying the microparticles with lectin or other carbohydrate binding protein effective for coupling with red blood cells.

29. A composition comprising a microencapsulated agent made by a method comprising:
 forming, at a first temperature, a emulsion which comprises aqueous microdroplets, including the agent and a cross-linkable matrix material, dispersed in a hydrophobic continuous phase comprising an oil soluble surfactant, the first temperature being below the temperature effective to initiate cross-linking of the matrix material; and
 heating the emulsion to a temperature and for a time effective to cause the matrix material to self-crosslink, to form microparticles comprising the agent encapsulated by the crosslinked matrix material.

30. The composition of claim 29, wherein the agent comprises a magnetic material.

31. The composition of claim 29, wherein the microparticles have a number average diameter between 300 and 800 nm.

32. The composition of claim 29, wherein the agent is in the form of nanoparticles having a number average diameter between 5 nm and 50 nm.

33. The composition of claim 29, wherein the agent comprises a drug.

34. The composition of claim 29, wherein the matrix material comprises a protein.

35. The composition of claim 29, wherein the agent comprises maghemite in the form of nanoparticles having a number average diameter between 5 nm and 50 nm, the matrix material comprises an albumin, and the microparticles have a number average diameter between 300 and 800 nm.

36. A composition comprising magnetic microparticles comprising:
 microparticles comprised of a crosslinked matrix material and an encapsulated magnetic material in the form of nanoparticles having a number average diameter between 5 nm and 50 nm, wherein the microparticles have a number average diameter between about 300 and about 800 nm and the matrix material comprises a protein.

* * * * *